Aug. 6, 1946.　　　　L. A. CARTER　　　　2,405,402
SELF-LOCKING BOLT OR NUT
Filed Dec. 27, 1943
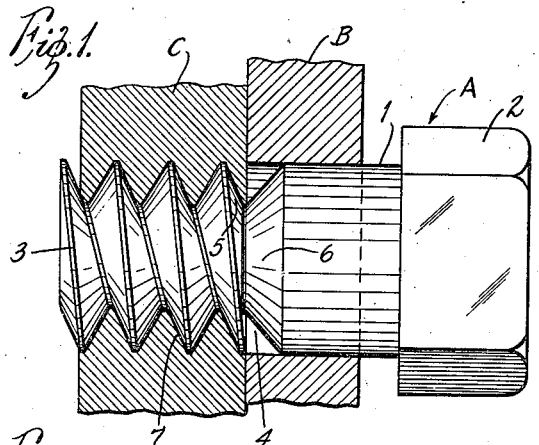
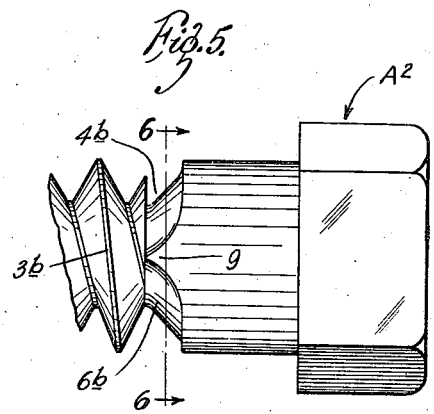
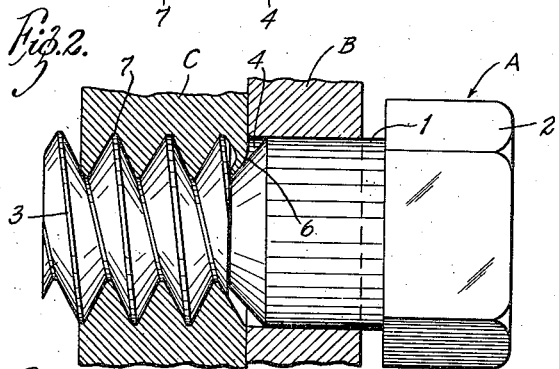
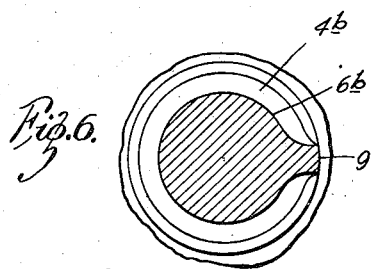
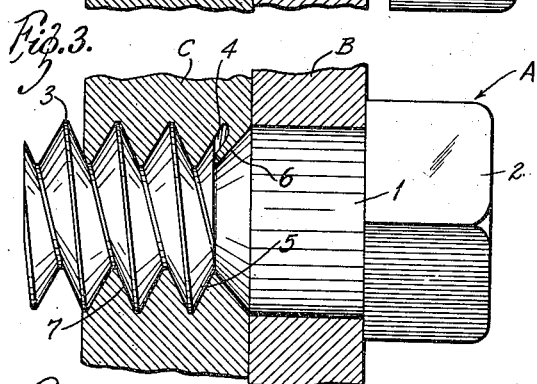
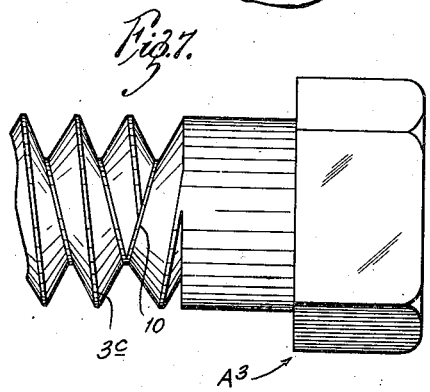
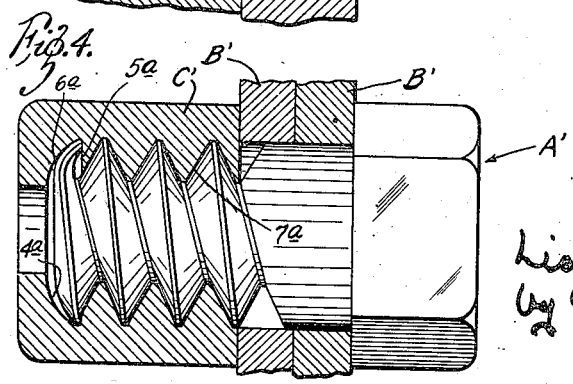
INVENTOR:
Lionel A. Carter,
by Carr Carr & Gravely,
HIS ATTORNEYS.

Patented Aug. 6, 1946

2,405,402

UNITED STATES PATENT OFFICE 2,405,402

SELF-LOCKING BOLT OR NUT

Lionel A. Carter, Webster Groves, Mo.

Application December 27, 1943, Serial No. 515,645

13 Claims. (Cl. 151—21)

1

This invention relates to bolt and nut locks and has for its principal object to provide means integral with the bolt or nut and adapted, when the bolt and/or nut are tightened, to resist the tendency to unscrew due to vibration and stresses. The invention consists in providing at the inner end of the screw thread of one of said bolt and nut members a circumferential shoulder adapted, when the nut and bolt are tightened, to axially upset the opposing end of the screw thread of the other member from helical to annular form, and thereby resist relative rotary movement of the tightened nut and bolt members. The invention also consists in inclining said abutment so that the screw thread is progressively upset from the apex thereof to the base thereof. The invention also consists in the bolt and in the nut; and it also consists in the construction, combinations and arrangements of parts hereinafter described and claimed.

In the accompanying drawing, which forms part of this specification and wherein like symbols refer to like parts wherever they occur, Fig. 1 is a side elevational view of a bolt embodying my invention, the bolt being shown in engagement with two parts that are to be secured together thereby, said parts being shown in section and the bolt being shown before being tightened, Fig. 2 is a view similar to Fig. 1 showing the bolt partially tightened, Fig. 3 is a view similar to Fig. 2 showing the bolt completely tightened, Fig. 4 is a view similar to Fig. 3 showing two parts secured together by a bolt provided with a nut embodying my invention, Fig. 5 is a fragmentary side elevation of a bolt provided with a locking means of modified form, Fig. 6 is a cross-sectional view on the line 6—6 in Fig. 5; and Fig. 7 is a fragmentary side elevational view of a bolt provided with another modified form of locking means.

In the constructions shown in Figs. 1, 2 and 3 of the accompanying drawing, A indicates a bolt embodying my invention and B and C indicate, respectively, the two members that are secured together by said bolt. As shown in the drawing, the bolt A comprises a shank 1 with a hexagonal head 2 and an external screw thread 3 which extends from the entering end of said bolt to a point short of said head. According to the present invention, the shank portion 1 of the bolt A has an annular groove 4 formed therein at the inner end of the screw thread 3, the depth

2 of said groove corresponding to the depth of said screw thread. The annular groove 4 has the wall 5 thereof next to the screw thread 3 disposed normal to the longitudinal axis of the bolt. The other wall 6 of the annular groove 4 inclines inwardly and forwardly from the periphery of the unthreaded portion of the shank 1 and meets the opposite wall 5 at the bottom of the groove, the angle of the inclined wall being less than the angle of the corresponding side face of the screw thread 3.

By the arrangement described, the bolt A is extended through the opening in the member B and is threaded into the threaded opening 7 in the nut or other member C until the inclined wall 6 of the annular groove 4 abuts against the bolt receiving end of said threaded opening. The bolt A is then tightened with sufficient force to press the inclined wall 6 thereof endwise against the bolt receiving end portion of the screw thread in the hole 7 of the nut or other member C, thus crowding or axially upsetting such portion of the thread so that it conforms to the annular groove and is changed from helical to annular form. This change of the bolt receiving end of the internal screw thread in the member C from helical to annular form in the annular groove 4 of the bolt A provides a bolt lock which effectually prevents separation of the bolt and nut under all stresses and vibrations except a rotary unscrewing force sufficient to restore the upset portion of the internal thread to its original helical form. The angle of the inclined wall 6 of the annular groove 4 is greater than the angle of the corresponding side wall of the internal thread, whereby the thread is progressively upset from its thin apex portion to its thick base portion, thus preventing shearing of such thick portion.

In the modification shown in Fig. 4, two members B', B' are secured together by means of an ordinary bolt A' and a self-locking nut C' embodying my invention. In this construction, the threaded hole 7a in the nut C' has an annular groove 4a formed therein at the inner end of the screw thread. The internal annular groove 4a in the nut C' is of a depth corresponding to the depth of the internal screw thread and has the wall 5a adjacent to the inner end of said screw thread disposed normal to the axis thereof. The opposite wall 6a of the annular groove 4a is inclined from the top thereof to the bottom thereof where it meets the other wall 5a. Thus, when the nut B' is tightened on the bolt A' with sufficient torsional force, the inclined wall 6a of the annular groove 4a of said nut bears axially against the outer or nut receiving end of the external thread 3a on said bolt and thus upsets or deforms said end of said thread axially into said annular groove, thereby firmly locking the bolt and nut together against relative rotation. In the constructions shown in Fig. 4 and in Figs. 1, 2 and 3, the bolt and nut may be unlocked by torsional stress sufficient to restore the deformed annular portion of the thread to its original helical form.

In the modification shown in Figs. 5 and 6, the thread upsetting wall 6b of the annular groove 4b at the inner end of the thread 3b of the bolt $A^2$ is machined to form a V-shaped rib or projection 9 on said wall. The rib or projection 9 is adapted, when the bolt is tightened, to concentrate the upsetting effect at the contact point of said rib with the internal thread with which the bolt cooperates.

In the modified construction shown in Fig. 7, the bolt $A^3$ is formed at the trailing end of the screw thread 3c with a short thread 10 in the form of a reverse helix adapted to concentrate the upsetting effect by a faster approach of the sides of the reversed helical thread to the portion of the internal thread upset thereby.

The hereinbefore described arrangements provide simple, economical and practicable bolt and nut constructions that are quickly and easily locked by turning the bolt and nut relative to each other with sufficient force to upset the thread of one member into the annular groove of the other member; and the lock bolt or nut may be unlocked only by a severe torsional force substantially equal to that required to upset the screw thread.

What I claim is:

1. The combination of a member having a hole with an internal screw thread and a member having an external screw thread cooperating with said internal screw thread, one of said members having an annular groove therein at the rear end of the screw thread thereof, said groove being arranged with the wall thereof remote from said rear end of said screw thread in position to bear axially against the front end of the screw thread of the other of said members to thereby upset said front end of said last mentioned screw thread from helical to annular form when said members are threaded together.

2. The combination of a member having a hole with an internal screw thread and a member having an external screw thread cooperating with said internal screw thread, the screw thread of one of said members terminating at its rear end in an annular groove, said groove having the wall thereof remote from said rear end of said screw thread inclined toward the bottom of the other wall of said groove and in position to bear axially against the front end of the screw thread of said other member to thereby upset said front end of said last mentioned screw thread from helical to annular form when said members are threaded together, the angle of inclination of the inclined wall of the annular groove being less than that of the wall of the thread engaged thereby.

3. The combination of a bolt and a nut therefor, said bolt having an external screw thread thereon and said nut having an internal screw thread therein adapted to cooperate with said external screw thread, said bolt having an annular groove therein at the inner end of the external screw thread thereon, said groove being arranged with the wall thereof remote from said rear end of said external screw thread in position to axially upset the front end of said internal screw thread when said nut and bolt are tightened.

4. The combination of a bolt and a nut therefor, said bolt having an external screw thread thereon and said nut having an internal screw thread therein adapted to cooperate with said external screw thread, said bolt having an annular groove therein at the inner end of the external thread thereon, said annular groove having the wall thereof remote from said end of said external thread inclined radially inwardly in the direction of the other wall of said annular groove, whereby said inclined wall bears axially against the bolt receiving end of the internal thread of said nut to thereby upset said end from helical to annular form when said bolt and nut are tightened, the angle of the inclined wall of said groove being less than that of the wall of the thread engaged thereby.

5. The combination of a bolt and a nut therefor, said bolt having an external screw thread and said nut having an internal screw thread adapted to cooperate with said external screw thread, said nut having at the rear end of the thread thereof a shoulder adapted when said nut is tightened on said bolt to bear axially against the front end of the screw thread on said bolt to thereby upset said front end of said external screw thread.

6. The combination of a bolt and a nut therefor, said bolt having an external screw thread and said nut having an internal screw thread adapted to cooperate with said external screw thread, said nut having at the rear end of the thread thereof a shoulder adapted when said nut is tightened on said bolt to bear axially against the front end of the screw thread on said bolt to thereby upset said front end of said external screw thread, the thread upsetting face of said shoulder being disposed at an angle that is less than that of the wall of the thread engaged thereby.

7. The combination of a bolt and a nut therefor, said bolt having an external screw thread thereon and said nut having an internal screw thread therein adapted to cooperate with said external screw thread, said nut having an annular groove therein at the rear end of the internal screw thread therein, said groove being arranged with the wall thereof remote from said rear end of said internal screw thread in position to axially upset the front end of said external screw thread when said nut and bolt are tightened.

8. The combination of a bolt and a nut therefor, said bolt having an external screw thread thereon and said nut having an internal screw thread therein adapted to cooperate with said external screw thread, said nut having an annular groove therein at the rear end of the internal screw thread therein, said groove being arranged with the wall thereof remote from said rear end of said internal screw thread in position to axially upset the front end of said external screw thread when said nut and bolt are tightened, said wall of said annular groove being inclined towards the other wall thereof at an angle that is less than that of the wall of the external thread engaged thereby.

9. A bolt having an external thread thereon and a reversely inclined external thread at the inner end of said external thread, whereby said reversely inclined thread, when the bolt is tightened in an internal thread, will axially upset the bolt receiving end thereof.

10. A nut having an internal thread therein and an annular groove at the inner end of said thread, said groove having the wall thereof remote from said end of said thread inclined inwardly towards the opposite wall of said groove, whereby said inclined wall when the nut is tightened on an external thread will axially upset the nut receiving end thereof.

11. A nut having an internal thread therein and an annular groove at the inner end of said thread, said groove having the wall thereof remote from said end of said thread inclined inwardly towards the opposite wall of said groove, whereby said inclined wall when the nut is tightened on an external thread will axially upset the nut receiving end thereof, said wall of said groove being disposed at an angle that is less than the wall of the external thread engaged thereby.

12. The combination of a bolt and a nut therefor, said bolt having an external screw thread and said nut having an internal screw thread adapted to cooperate with said external screw thread, said bolt having an annular groove therein at the inner end of the thread thereon, said groove being arranged with the wall thereof remote from said inner end of said external thread in position to axially upset the front end of said internal screw thread when said bolt and nut are tightened, said remote wall of said groove having a V-shaped projection thereon adapted, when the bolt is tightened, to concentrate the upsetting effect at the contact point of said rib with said internal thread.

13. The combination of a bolt and a nut therefor, said bolt having an external screw thread and said nut having an internal screw thread adapted to cooperate with said external screw thread, said bolt having at the rear end of the thread thereof a second external screw thread whose helix angle differs from the helix angle of said first mentioned thread of said bolt and is adapted, when said bolt and nut are tightened to axially upset the front end of the screw thread of said nut and thus prevent unscrewing of said bolt and nut.

LIONEL A. CARTER.